(12) United States Patent
Nishimura et al.

(10) Patent No.: US 7,825,778 B2
(45) Date of Patent: Nov. 2, 2010

(54) ELECTRONIC APPARATUS PROVIDING A VIBRATING FUNCTION TO GIVE OPERATION FEELING TO AN OPERATOR

(75) Inventors: Hideki Nishimura, Kawasaki (JP); Syunichi Yamashita, Kawasaki (JP)

(73) Assignee: NEC Infrontia Corporation, Kanagawa (JP)

( * ) Notice: Subject to any disclaimer, the term of this patent is extended or adjusted under 35 U.S.C. 154(b) by 90 days.

(21) Appl. No.: 11/344,064

(22) Filed: Feb. 1, 2006

(65) Prior Publication Data

US 2006/0181522 A1 Aug. 17, 2006

(30) Foreign Application Priority Data

Feb. 3, 2005 (JP) ............................... 2005-27391

(51) Int. Cl.
*H04B 3/36* (2006.01)
(52) U.S. Cl. .................. 340/407.2; 341/34; 345/177
(58) Field of Classification Search ............. 340/407.1, 340/407.2; 345/177; 361/681; 341/21, 26, 341/34
See application file for complete search history.

(56) References Cited

U.S. PATENT DOCUMENTS

| | | | | |
|---|---|---|---|---|
| 5,977,867 A | * | 11/1999 | Blouin | 340/407.2 |
| 6,429,846 B2 | * | 8/2002 | Rosenberg et al. | 345/156 |
| 6,501,463 B1 | * | 12/2002 | Dahley et al. | 345/173 |
| 6,888,537 B2 | * | 5/2005 | Benson et al. | 345/173 |
| 6,931,124 B1 | * | 8/2005 | Rubacha et al. | 379/421 |
| 6,937,124 B1 | * | 8/2005 | Nakamura et al. | 335/222 |
| 7,148,875 B2 | * | 12/2006 | Rosenberg et al. | 345/156 |
| 2005/0156911 A1 | * | 7/2005 | Tanaka et al. | 345/177 |

FOREIGN PATENT DOCUMENTS

| | | | |
|---|---|---|---|
| CN | 1396501 A | | 2/2003 |
| JP | 62-107323 A | | 5/1987 |
| JP | 2004/094389 | * | 3/2004 |
| JP | 2004-94389 A | | 3/2004 |
| JP | 2004094389 | * | 3/2004 |
| JP | 2004094389 A | * | 3/2004 |
| KR | 2004-0064271 A | | 7/2004 |
| WO | WO 2004/021160 A1 | | 3/2004 |
| WO | WO2004021160 A1 | * | 11/2004 |
| WO | WO2004021160 A1 | * | 11/2004 |

* cited by examiner

*Primary Examiner*—Davetta W Goins
*Assistant Examiner*—Edny Labbees
(74) *Attorney, Agent, or Firm*—Sughrue Mion, PLLC

(57) ABSTRACT

In an electronic apparatus having a touch panel and pair of vibrating elements for vibrating the touch panel, pair of fixing cushions are fixed on a rear surface of the touch panel along right and left edges of the touch panel. The vibrating elements are fixed to the rear surface of the touch panel along upper and lower edges of the touch panel. The fixing cushions are also fixed to a fixing frames and thereby the touch panel is supported by the fixing frame. The fixing cushions are parallel to each other and stably support the touch panel against the fixing frame. Furthermore, the cushions allow the touch panel to greatly vibrate according to expansion and contraction of the vibrating elements.

13 Claims, 9 Drawing Sheets

| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | 19 | 20 |
| 21 | 22 | 23 | 24 | 25 |

…

ELECTRONIC APPARATUS PROVIDING A VIBRATING FUNCTION TO GIVE OPERATION FEELING TO AN OPERATOR

This application claims priority to prior application JP 2005-027391, the disclosure of which is incorporated herein by reference.

BACKGROUND OF THE INVENTION

This invention relates to an electronic apparatus, particularly, to improvement of an electronic apparatus which is configured so that a flat vibrating body (e.g. a touch panel) is vibrated by a vibrating element(s).

A touch panel is well known as an input device for an electronic apparatus, A type of the touch panel provides a vibrating function to give operation feeling to an operator.

The touch panel having the vibrating function vibrates when its surface is pressed with a finger of the operator, a stylus held by the operator, or the like. The vibration of the touch panel is transmitted to the operator through his/her finger or the like. Thus, the operator perceives whether input operation executed by the operator is accepted by the electronic apparatus or not.

A conventional electronic apparatus having the touch panel with the vibration function has four bimorph type piezoelectric actuators, as the vibrating element, disposed at vicinities of four corners on a front surface of a quadrangular supporting frame. Specifically, the actuators have a rectangular plate shape and are fixed at vicinities of both ends of longitudinal frame portions of the supporting frame. The touch panel is disposed at the front side of the supporting frame to leave a space between them and to be vibrated by the actuators. To set the distance between the supporting frame and the touch panel, touch panel supporting members are disposed between them at the four corners.

Thus, the touch panel is supported at the four corners against the supporting frame in the conventional electronic apparatus. Furthermore, the touch panel supporting members are relatively soft to allow the touch panel to reciprocate. Accordingly, the conventional electronic apparatus has a problem that there is apprehension of lack of attaching strength between the touch panel and the supporting frame. When the attaching strength is insufficient, the touch panel comes off the electronic apparatus because of vibration from inside and/or outside of the electronic apparatus or a shock from the outside of the electronic apparatus.

Such an electronic apparatus is disclosed in Unexamined Japanese Patent Publication No. 2004-94389.

Another electronic apparatus has a dust seal and a holding frame which stably support all edges of a touch panel. With this structure, the touch panel does not come off the electronic apparatus. However, the electronic apparatus has a problem that it is very difficult to ensure compatibility between starting vibration of the touch panel and avoiding damping the vibration of the touch panel. That is, the structure that all edges of the touch panel are strongly supported brings a result that the touch panel vibrates hardly or that the vibration of the touch panel is damped or absorbed significantly.

Such an electronic apparatus is also disclosed in the above mentioned Publication.

SUMMARY OF THE INVENTION

It is therefore an object of this invention to provide an electrical apparatus having a flat vibrating body which is securely and stably supported to be able to vibrate greatly and to hardly absorb the vibration of the flat vibrating body.

Other objects of this invention will become clear as the description proceeds.

According to an aspect of this invention, an electronic apparatus includes a flat vibrating body and a vibrating element used for vibrating the flat vibrating body. The electronic apparatus comprises pair of fixing cushions which are parallel to each other and fixed on the flat vibrating body apart from the vibrating element to support the flat vibrating body.

In the electronic apparatus, the vibrating element may be disposed along an edge of the flat vibrating body while the fixing cushions are disposed along other edges of the flat vibrating body.

Particularly, the flat vibrating body may have rectangular shape with first and second pairs of parallel edges. In this case, the vibrating element is disposed along one of the first parallel edges while the fixing cushions are disposed along the second pair of parallel edges.

The vibrating element and the fixing cushions may be fixed on a surface of the flat vibrating body.

The electronic apparatus may comprise a fixing frame to which the flat vibrating body is fixed with the fixing cushions.

The vibrating element may be a touch panel.

The fixing frame may be a liquid crystal display panel.

DESCRIPTION OF THE PREFERRED EMBODIMENTS

Referring to FIGS. 1 to 5, a description will be directed to an electronic apparatus according to a first embodiment of this invention.

Figure 1:
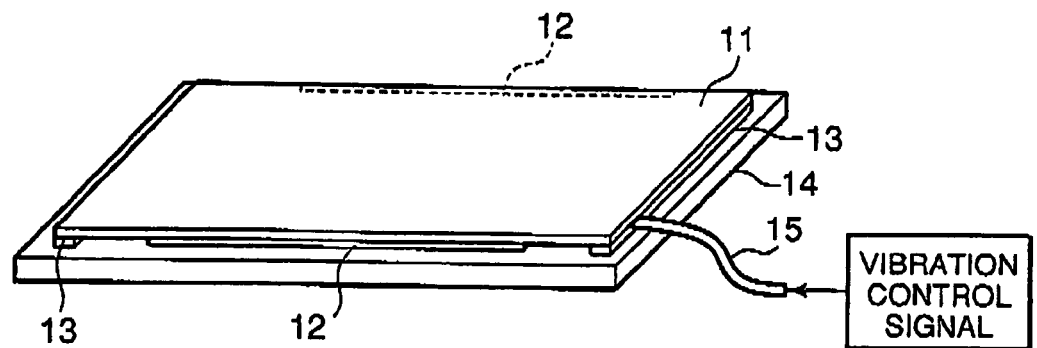
FIG. 1 is a perspective view of an electronic apparatus according to a first embodiment of this invention.
Figure 2:
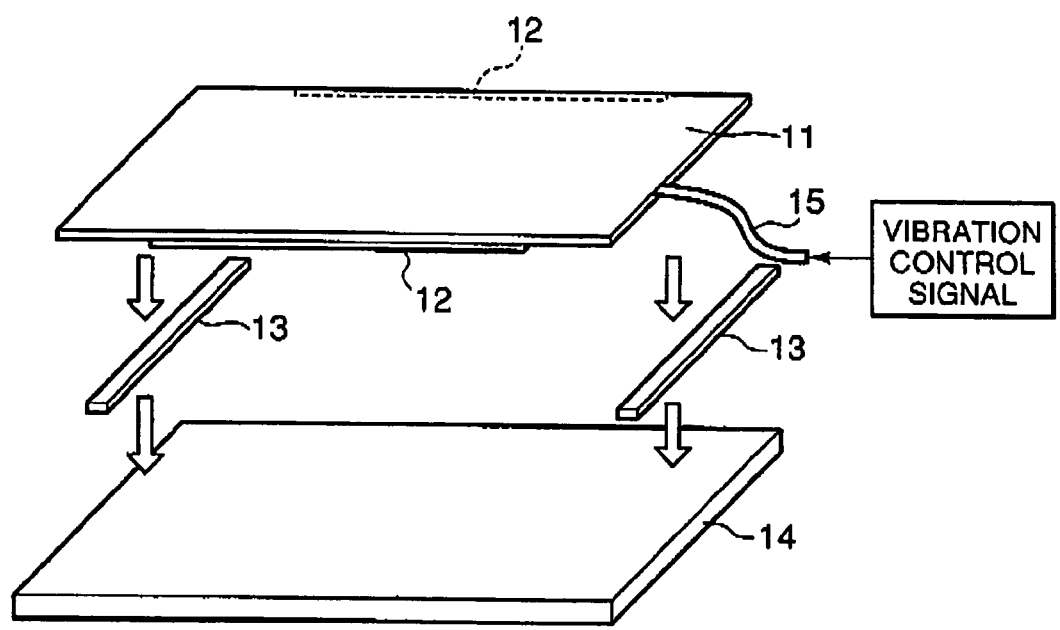
FIG. 2 is an exploded perspective view of the electronic apparatus of FIG. 1.

FIG. 1 is a perspective view of the electronic apparatus (or a panel assembly) of the first embodiment while FIG. 2 is an exploded perspective view thereof.

The electronic apparatus includes a rectangular touch panel (or a flat vibrating body) 11 having a glass or resinous substrate at a rear side thereof. On a rear surface of the touch panel 11, pair of vibrating elements 12 are fixed along upper (or rear side of FIG. 2) and lower (or front side of FIG. 2) edges of the touch panel 11. The rear surface of the touch panel 11 corresponds to an exposed surface of the glass or resinous substrate. Further, on the rear surface of the touch panel 11, pair of fixing cushions 13 are fixed along right and left edges of the touch panel 11. The fixing cushions 13 are fixed to a fixing frame (e.g. a liquid crystal display panel) 14 to attach the touch panel 11 to the fixing frame 14.

The touch panel 11 is configured like a known touch panel.

The vibrating elements 12 are piezoelectric elements, actuators, or the like, and are connected to a vibration control signal line 15. The vibrating elements 12 are out of touch with the fixing frame 14. The vibrating elements 12 are expanded and contracted by a vibration control signal (or a driving voltage) supplied from an external controller (not shown) through the vibration control signal line 15. Expansion and contraction of the vibrating elements 12 elastically bend the touch panel 11 and cause flexural vibration to the touch panel 11.

The fixing cushions 13 have a long and narrow rectangular (parallelepiped) shape. The fixing cushions 13 are located parallel with each other to attach the touch panel 11 with the fixing frame 14. The fixing cushions 13 attach the touch panel 11 to the fixing frame 14 and serve as fulcrums (or nodes) in case where the touch panel 11 vibrates. The fixing cushions 13 have a thickness to leave a space for vibration of the touch panel 11 between the touch panel 11 and fixing frame 14. That in, the fixing cushions 13 are larger than the vibrating elements 12 in thickness. The fixing cushions 13 are fixed to the rear surface of the touch panel 11 along the edges, which are different from those along which the vibrating elements 12 are fixed, of the touch panel 11 by double faced adhesive tapes, adhesive material, or the like. The fixing cushions 13 are out of touch with the vibrating elements 12. Because the touch panel 11 is supported by the fixing cushions 13 at two parallel edges different from those on which the vibrating elements 12 are fixed, it is securely and stably supported by the fixing frame 14 through the fixing cushions 13. Furthermore, the touch panel 11 can vibrate effectively and greatly.

Figure 3:
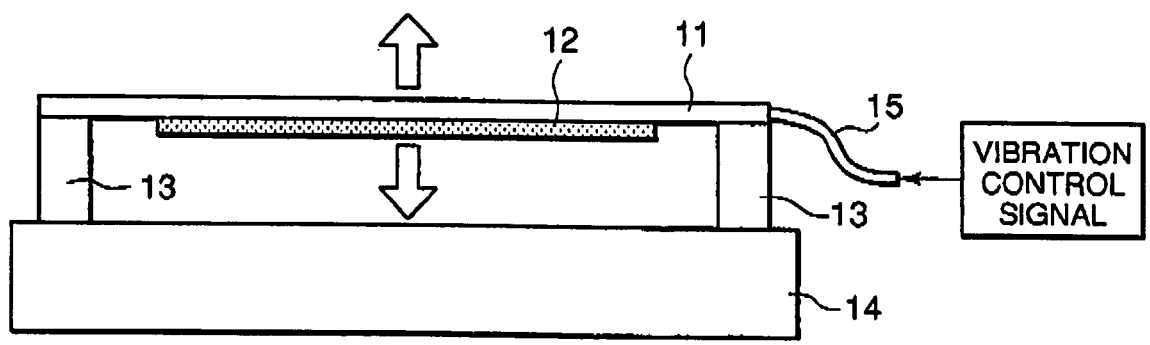
FIG. 3 is a schematic diagram for describing a vibrating state of a touch panel included in the electronic apparatus of FIG. 1.

FIG. 3 shows a vibrating state of the touch panel 11. Upon supplying the vibration control signal (or AC voltage) to the vibration control signal line 15, the vibrating elements 12 are expanded and contracted in a lateral direction of FIG. 3 according to the vibration control signal. Because the touch panel 11 is supported by the fixing cushions 13 at the both edges thereof, the expansion and contraction of the vibrating elements 12 in the lateral direction bend the touch panel 11 elastically in an upward and downward direction as depicted by outline arrows in FIG. 3. Thus, the touch panel 11 vibrates like a beam which both ends thereof are fixed. That is, the flexural vibration is caused to the touch panel 11.

When the fixing cushions 13 are too hard, it is difficult for the touch panel 11 to vibrate. To the contrary, when the fixing cushions 13 are too soft, it damps (or absorbs) the vibration of the touch panel 11. Therefore, the fixing cushions 13 need softness to allow the vibration of the touch panel 11 and hardness to hardly absorb the vibration of the touch panel 11. The fixing cushions 13 are made of material selected to meet the requirements mentioned above. It is preferable that high density micro cell polyurethane foam is used as the material of the fixing cushions 13. In particular, PORON HH-48 with 40-50 degrees of hardness or PORON H-48 with 40 degrees of hardness is more preferable as the material for the fixing cushions 13. The PORON is a brand name owned by ROGERS INOAC CORPORATION.

Figure 4:
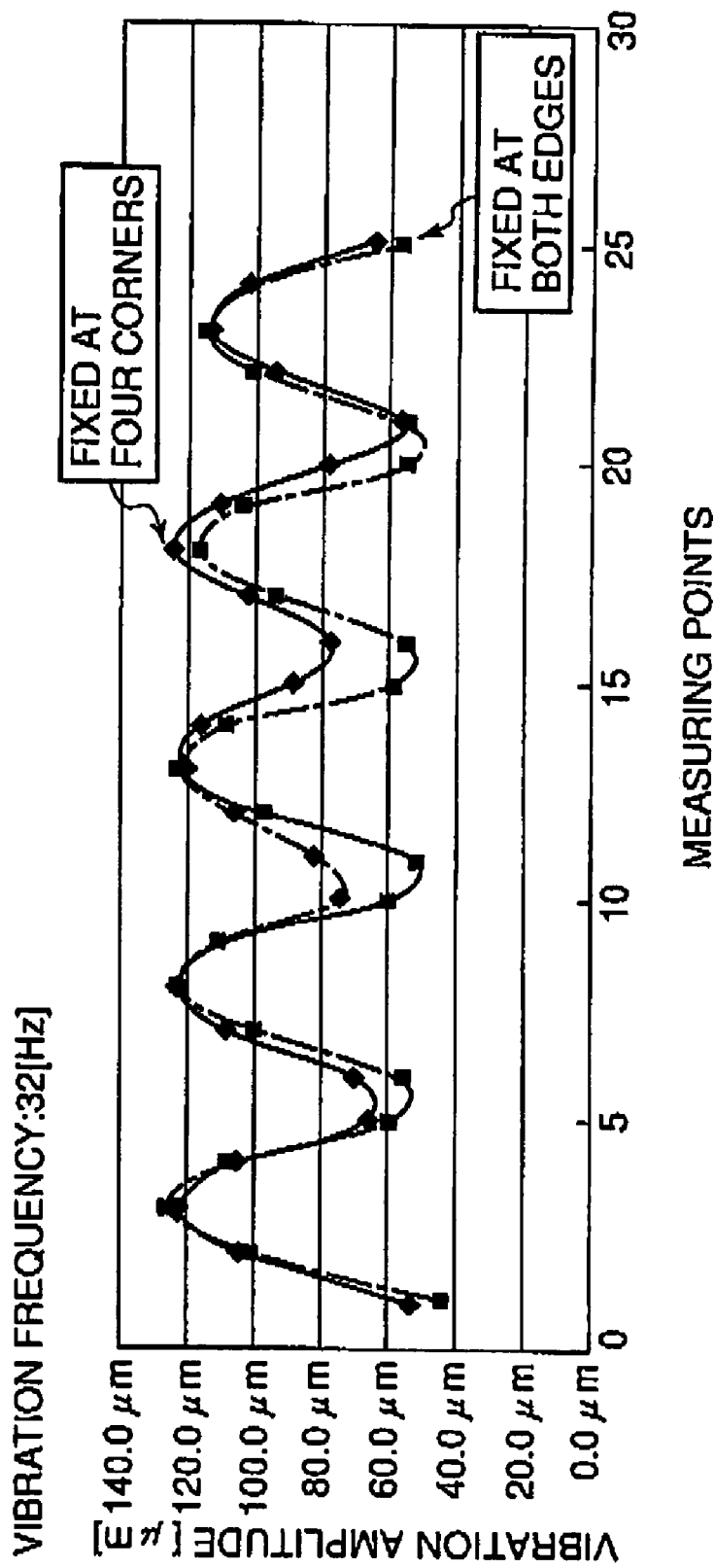
FIG. 4 is a graph representing measuring results regarding vibration amplitudes of the touch panel included in the electronic apparatus of FIG. 1 and regarding vibration amplitudes of the conventional touch panel fixed at four corners thereof.
Figures 5, 6:
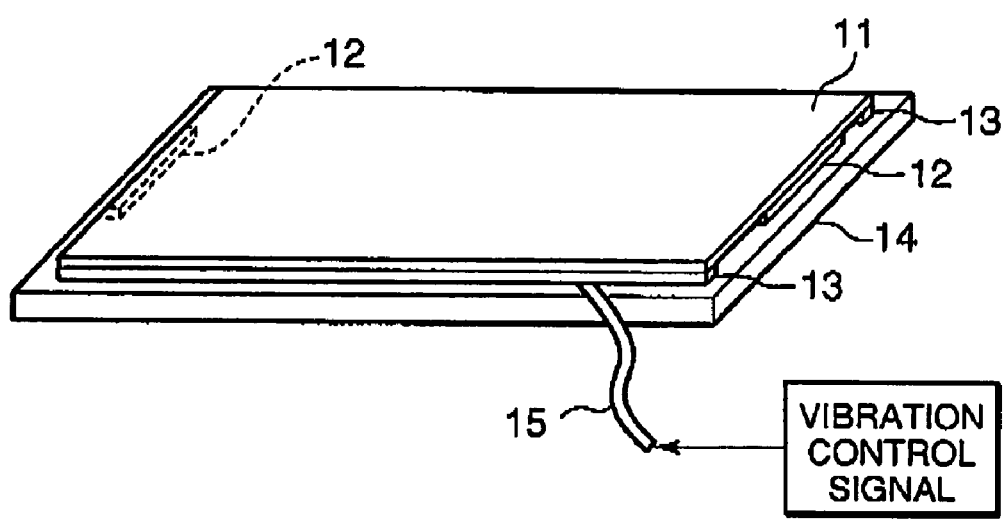
FIG. 5 is a diagram showing relationships between regions of the touch panel and measuring points of FIG. 4.
FIG. 6 is a perspective view showing a variation of the electronic apparatus of the first embodiment.

FIG. 4 shows measuring results regarding vibration amplitudes of the touch panel 11 of this embodiment and regarding vibration amplitudes of the conventional touch panel fixed at four corners thereof. To measure the vibration amplitudes, the surface of each touch panel is divided into twenty five regions as illustrated in FIG. 5. The measurement is executed at the center of each region of the touch panel. The numbers assigned to the regions of FIG. 5 correspond to the measuring points (or a horizontal axis) of FIG. 4.

As understood from FIG. 4, the vibration amplitudes of the touch panel 11 are about the same as those of the conventional touch panel. Though the vibration amplitudes of the touch panel 11 are slightly smaller than those of the conventional touch panel at the vicinity of the fixing cushions 13, the differences are too small to be a problem. Thus, in the electronic apparatus of this embodiment, large amplitudes are obtained at a center part, which tends to receive high frequent input operations, of the touch panel 11 while sufficient amplitudes are obtained at a peripheral part, which tends to have low frequency of the input operations, of the touch panel 11.

As mentioned above, according to this embodiment, the touch panel 11 is supported by the fixing cushions 13 located parallel with each other along edges different from those to which the vibrating elements 12 are fixed. Therefore, deformation of the vibrating elements 12 is efficiently changed into flexural vibration of the touch panel 11 and thereby large vibration of the touch panel 11 is obtained like the conventional touch panel fixed at the four corners. Furthermore, absorption of the vibration of the touch panel 11 is sufficiently avoided by selecting the material for the fixing cushions 13 properly.

Because the fixing cushions 13 have a length nearly equal to length of the edges of the touch panel 11, total fixing area is several times as large as that of the conventional touch panel fixed at the four corners. Consequently, the touch panel 11 is securely and stably fixed to the fixing frame 14 by the fixing cushions 13.

Because the touch panel 11 is supported by the fixing cushions 13 supporting the touch panel 11 are parallel to each other, differences of the vibration amplitudes are small with regard to a direction parallel to the fixing cushions 13.

Figure 7:
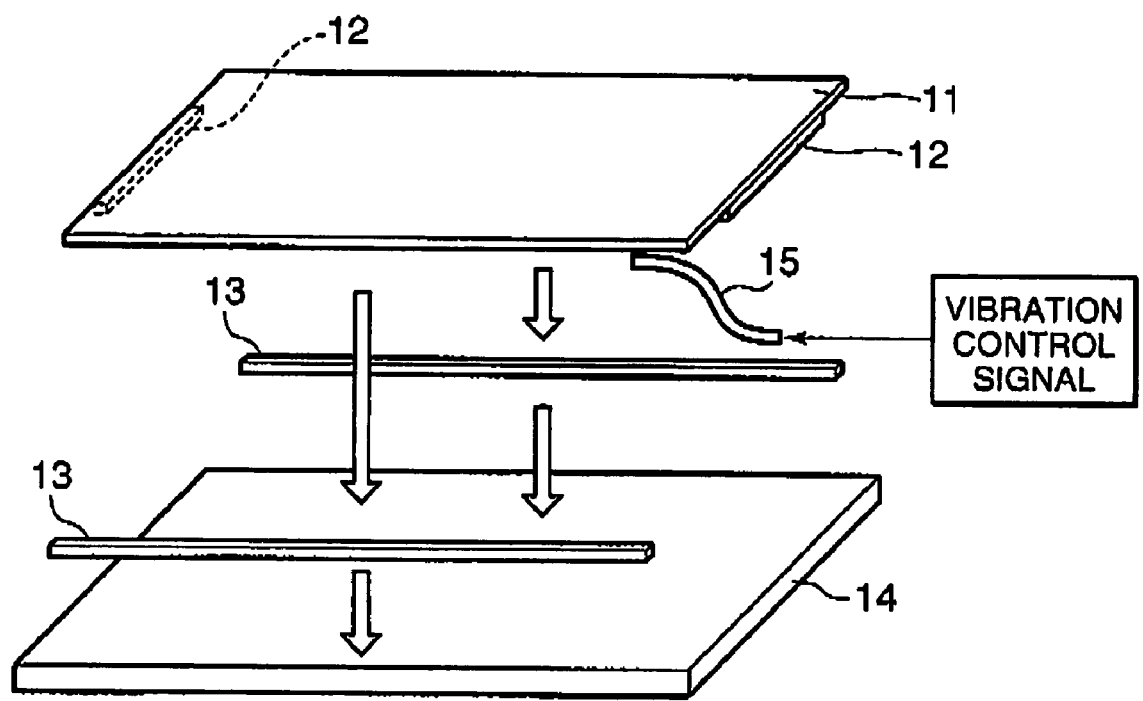
FIG. 7 is an exploded perspective view of the electronic apparatus of FIG. 6.

As mentioned above, in this embodiment, the vibrating elements 12 are provided along the upper and the lower edges which are long sides of the touch panel 11 while the fixing cushions 13 are provided along the right and the left edges which are short sides of the touch panel 11. However, as illustrated in FIGS. 6 and 7, the vibrating elements 12 may be provided along the right and the left edges which are short sides of the touch panel 11 while the fixing cushions 13 may be provided along the upper and the lower edges which are long sides of the touch panel 11.

Figure 8A:
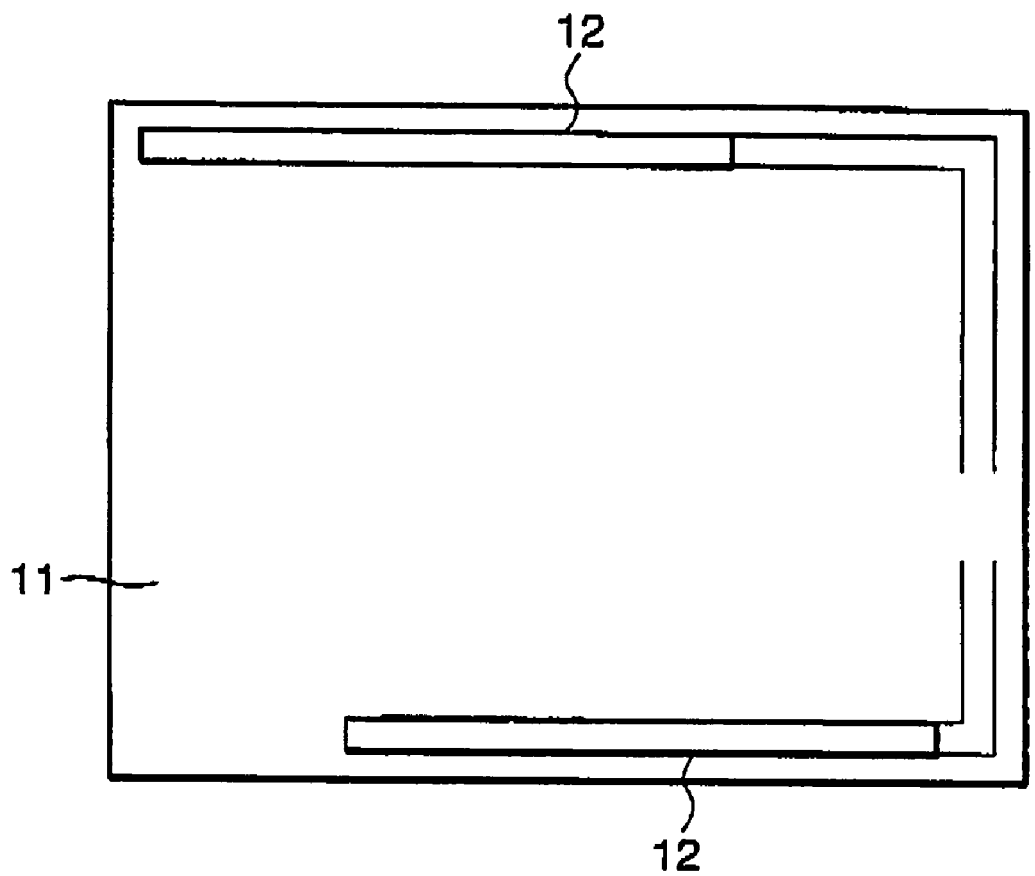
FIG. 8A is a schematic plane view showing another variation of the electronic apparatus of the first embodiment.
Figure 8B:
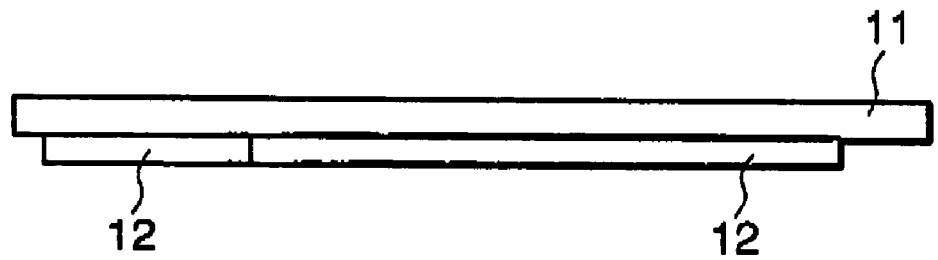
FIG. 8B is a schematic side view of the electronic apparatus of FIG. 8A.

Furthermore, it is unnecessary that the vibrating elements 12 stretch from one ends of the upper and the lower (or the right and the left) edges to the other ends of the touch panel 11. The vibrating elements 12 may be provided, for example, as illustrated in FIGS. 8A and 8B. That is, one of the vibrating elements 12 may be provided at the right hand side of the upper/lower edge while the other may be provided at the left hand side of the lower/upper edge. In addition, the number of the vibrating elements 12 is not limited to two. The number may be decided on one or more according to the size and/or the shape of the touch panel (or the flat vibrating body) 11.

Next, referring to FIGS. 9 to 11, the description will be made about an electronic apparatus (i.e. a POS terminal) according to a second embodiment of this invention.

Figure 9:
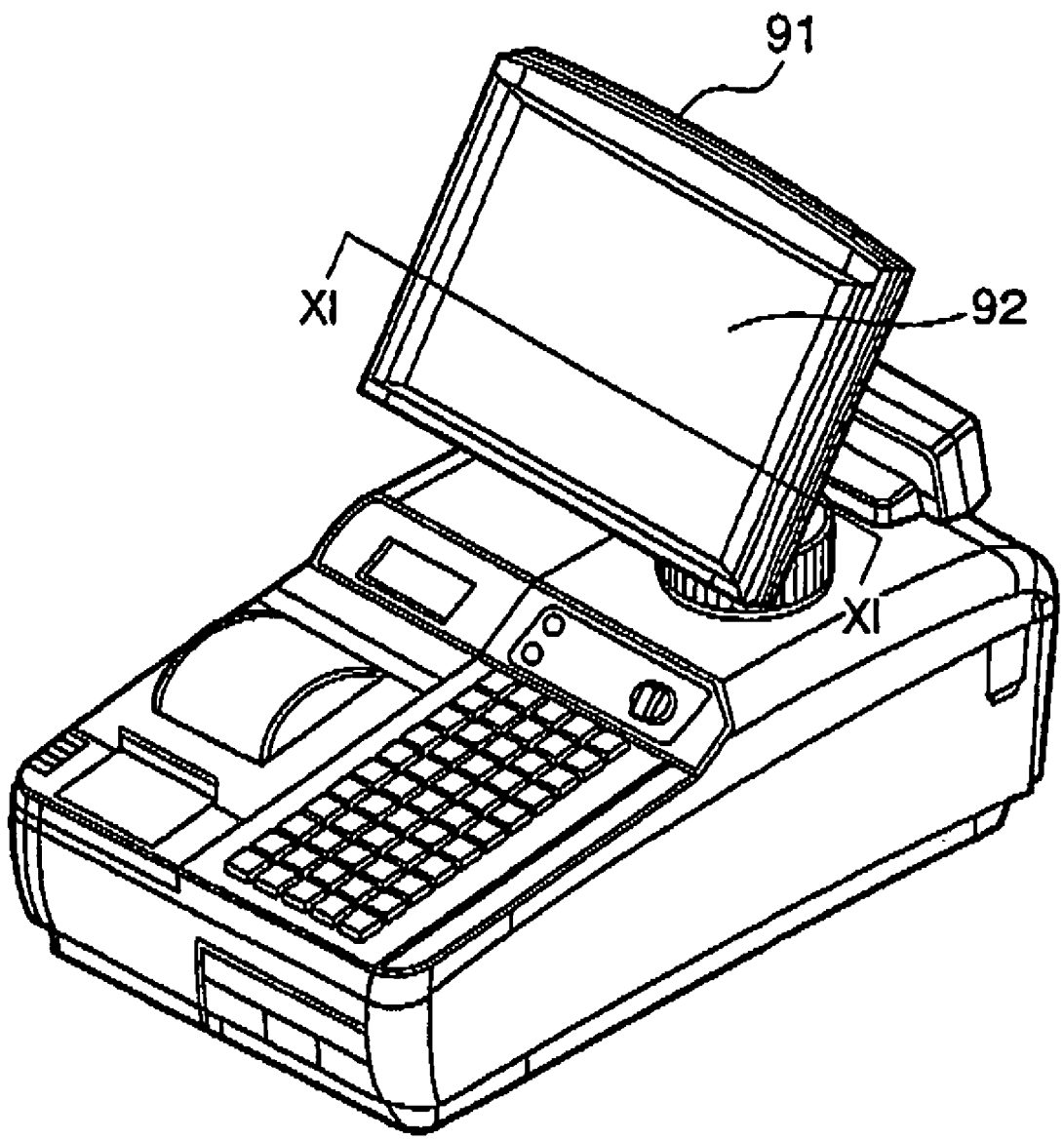
FIG. 9 is a perspective view of an electronic apparatus according to a second embodiment of this invention.
Figure 10:
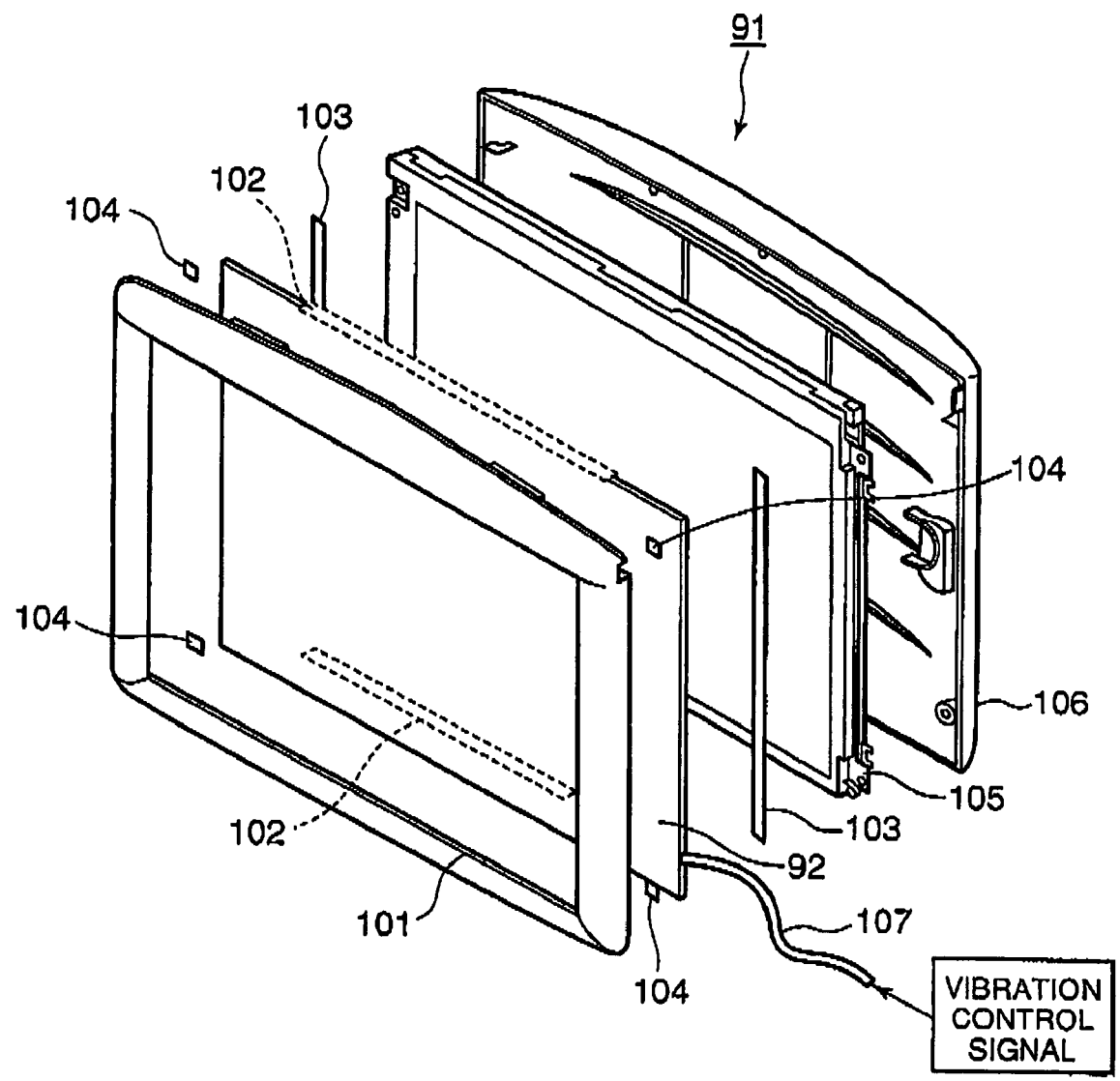
FIG. 10 is an exploded perspective view of a display and touch panel portion included in the electronic apparatus of FIG. 9.

The electronic apparatus of FIG. 9 has a display and touch panel portion 91. The display and touch panel portion 91 includes a touch panel 92 with a vibrating function. FIG. 10 is an exploded perspective view of the display and touch panel portion 91. FIG. 11 is a partly sectional view of the display and touch panel portion 91.

The display and touch panel portion 91 serves as a display unit for displaying information and as an input unit for receiving input data. The display and touch panel portion 91 includes a front bezel 101, vibrating elements 102, fixing cushions 103, pressing cushions 104, a liquid crystal display panel (LCD) 105, and a rear cover 106, in addition to the touch panel 92. A combination of the touch panel 92, the vibrating elements 102, the fixing cushions 103 and the LCD 105 corresponds to the panel assembly of FIG. 1. The front bezel 101 and the rear cover 106 form a housing for housing the panel assembly.

The touch panel 92 is similar to a known touch panel and configured to detect coordinates representing a pressed position on a surface thereof. Furthermore, the touch panel 92 is formed by the use of transparent substrate, transparent electrodes, transparent insulating films, and so on, so that display of the LCD 105 can be seen through the touch panel 92.

The vibrating elements 102 are unimorph type piezoelectric elements, for example. To provide a vibrating function to the touch panel 92, the vibrating elements 102 are fixed to a glass (or resinous) substrate of the touch panel 92 along upper and lower edges of the touch panel 92. The surface of the glass substrate corresponds to the rear surface of the touch panel 92. The number of the vibrating elements 102 is not limited to two and may be at least one. At any rate, one or more vibrating elements may be fixed to the touch panel 92 along the upper edge and/or the lower edge of the touch panel 92. The vibrating elements 102 are connected to a vibration control signal line 107. The vibrating elements 102 are expanded and contracted by supplying a vibration control signal (or AC voltage) through the vibration control signal line 107 and flexural vibration is caused to the touch panel 92.

The fixing cushions 103 are made of PORON HH-48 (the brand name), for example. The fixing cushions 103 are fixed to the rear surface of the touch panel 92 along edges different from those on which the vibrating elements 102 are fixed. The fixing cushions 103 are further fixed to the LCD 105 and thereby the touch panel 92 is attached to the LCD 105. In other words, the LCD 105 supports the touch panel 92 through the fixing cushions 103. The fixing cushions 103 serve as fulcrums when the touch panel 92 vibrates. As mentioned regarding the first embodiment, it is desirable that the fixing cushions 103 are made of material which allows the touch panel 92 to vibrate and which can avoid absorbing the vibration of the touch panel 92 as possible and which is neither too soft nor too hard. For example, the material may have about 40 degrees of hardness. When the fixing cushions 103 are too hard, it is difficult for the touch panel 92 to vibrate. To the contrary, when the fixing cushions 103 are too soft, it absorbs the vibration of the touch panel 92 to reduce amplitude of the vibration.

Figure 11:
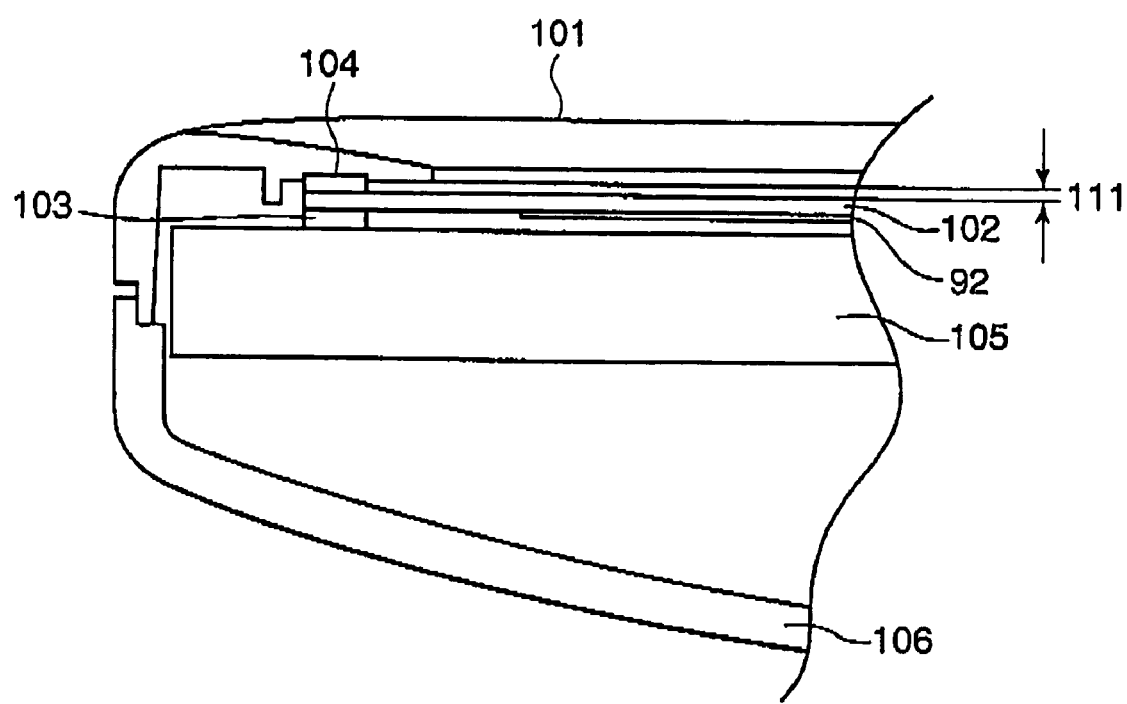
FIG. 11 is a partly sectional view taken along a line XI-XI of FIG. 9.

As shown in FIG. 11, the pressing cushions 104 are disposed between the front bezel 101 and the touch panel 92 to make an interval 111 between them. The pressing cushions 104 are designed so as not to prevent and absorb the vibration of the touch panel 92. Furthermore, the pressing cushions 104 are designed so that the touch panel 92 does not touch (or tap) the front bezel 101 during the vibration thereof. To meet these conditions, material and size of the pressing cushions 104 are appropriately selected and decided. In this embodiment, the pressing cushions 104 made of soft urethane form, e.g. POLON L32 (the brand mane), are disposed at vicinities of four corners of the touch panel 92. Because the pressing cushions 104 are disposed at the vicinities of the four corners of the touch panel 92, the touch panel 92 is further securely and stably held without preventing and absorbing the vibration thereof.

As mentioned above, the fixing cushions 103 disposed parallel to each other physically fix the touch panel 92 having the vibration function to the LCD 105 which is as a touch panel mounting. Thus, the touch panel 92 is fixed to the LCD 105 securely and stably by the pair of fixing cushions 103. When the vibration control signal is supplied to the vibrating elements 102 through the vibration control signal line 107, the touch panel 92 vibrates according to waveform of the vibration control signal by the use of the fixing cushions 103 disposed parallel to each other as fulcrums. The touch panel 92 vibrates greatly, because the fixing cushions 103 parallel to each other serves as the fulcrums. Here, differences of vibration amplitudes of the touch panel 92 are small with regard to a direction parallel to the fixing cushions 103. Additionally, the vibration amplitudes of the touch panel 92 are the maximum at the middle between the fixing cushions 103 (or at the center portion of the touch panel 92). The vibration amplitudes are larger when the vibration control signal has a frequency equal to a resonance frequency of the touch panel 92.

According to the embodiment, the electronic apparatus vibrates the touch panel 92 when an operator executes input operation to the touch panel 92. Consequently, operation feeling is given to the operator by the touch panel 92. The electronic apparatus particularly vibrates the center part, which tends to receive high frequent input operations, of the touch panel 92 greatly and uniformly.

Next, the description will be made about still another electronic apparatus (e.g. a panel assembly) according to a third embodiment of this invention with reference to FIG. 12.

The electronic apparatus of this embodiment is similar to that of the first embodiment except for providing dustproof cushions 121.

Figure 12:
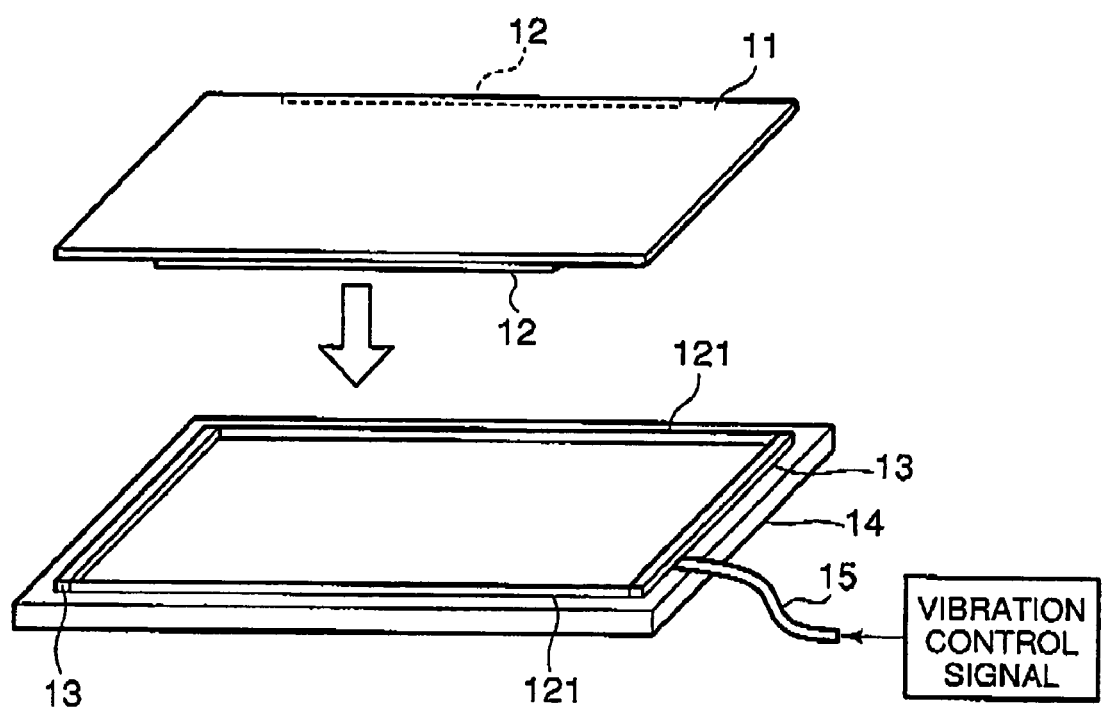
FIG. 12 is an exploded perspective view of an electronic apparatus according to a third embodiment of this invention.

As shown in FIG. 12, the providing dustproof cushions 121 disposed between the touch panel 11 and the fixing frame (e.g. LCD) 14 along the edges, on which the vibrating elements 12 are provided, of the touch panel 11. The dustproof cushions 121, as understood from the name, prevent dust from coming in the space between the touch panel 11 and the fixing frame 14. The dustproof cushions 121 are made of material which is very soft in comparison with that of the fixing cushions 13 so as not to prevent and absorb the vibration of the touch panel 11.

In the electronic apparatus of this embodiment, the touch panel 11 is securely and stably fixed to the fixing frames 14 and allowed to vibrate greatly.

While this invention has thus far been described in conjunction with the preferred embodiments thereof, it will readily be possible for those skilled in the art to put this invention into practice in various other manners. For example, the electronic apparatus may be an automatic teller machine (ATM), a point of sale (POS) terminal, a personal computer (PC), a personal digital assistant (PDA), a mobile telephone, or the like. At any rate, this invention is applicable to the electronic apparatus including a touch panel or a vibrating board with vibrating function.

What is claimed is:

1. An electronic apparatus including a flat vibrating body and a pair of vibrating elements used for vibrating said flat vibrating body, comprising:
   a pair of elongated fixing cushions which are parallel to each other and disposed on a surface of said flat vibrating body to support said flat vibrating body, and
   a fixing frame to which said flat vibrating body is fixed with said fixing cushions, wherein said fixing cushions are located at positions other than the four corners of said flat vibrating body and at positions away from said vibrating elements,
   wherein said flat vibrating body has first and second pairs of parallel edges, and
   wherein said vibrating elements are disposed on said surface of said flat vibrating body only along said first pair of parallel edges while said fixing cushions are disposed on said surface of said flat vibrating only along said second pair of parallel edges.

2. An electronic apparatus as claimed in claim 1, wherein said fixing frame does not touch said vibrating elements.

3. An electronic apparatus as claimed in claim 1, wherein said vibrating body comprises a touch panel.

4. An electronic apparatus as claimed in claim 1, wherein said fixing frame comprises a liquid crystal display panel.

5. An electronic apparatus as claimed in claim 1, wherein said fixing cushions have a thickness to leave a space between said flat vibrating body and said fixing frame.

6. An electronic apparatus as claimed in claim 1, wherein said fixing cushions have a thickness to leave a space between said vibrating elements and said fixing frame.

7. An electronic apparatus as claimed in claim 1, wherein a first vibrating element and second vibrating element are disposed parallel to one another and are offset from one another in a direction parallel to said first pair of parallel edges.

8. An electronic apparatus as claimed in claim 1, wherein each vibrating element of said pair of vibrating elements comprises at least two vibrating elements only along said first pair of parallel edges and each elongated fixing cushion of said pair of fixing cushions comprises at least two elongated fixing cushions only along said second pair of parallel edges.

9. An electronic apparatus as claimed in claim 1, where said pair of fixing cushions are further fixed to a liquid crystal display (LCD), said LCD further supporting the flat vibrating body.

10. An electronic apparatus as claimed in claim 1, wherein the pair of fixing cushions allow the flat vibrating body to vibrate without dampening the vibration of the flat vibrating body.

11. An electronic apparatus as claimed in claim 1, wherein the pair of fixing cushions are made of high density micro cell polyurethane foam with 40 to 50 degrees of hardness.

12. An electronic apparatus as claimed in claim 1, wherein the pair of fixing cushions have are made of a material that has 40 degrees of hardness.

13. An electronic apparatus as claimed in claim 10, wherein said space extends between an entire bottom surface of a first one of said pair of vibrating elements and said fixing frame, and
   wherein said space extends between an entire bottom surface of a second one of said pair of vibrating elements and said fixing frame.

* * * * *

UNITED STATES PATENT AND TRADEMARK OFFICE
CERTIFICATE OF CORRECTION

| | | |
|---|---|---|
| PATENT NO. | : 7,825,778 B2 | Page 1 of 1 |
| APPLICATION NO. | : 11/344064 | |
| DATED | : November 2, 2010 | |
| INVENTOR(S) | : Hideki Nishimura and Syunichi Yamashita | |

It is certified that error appears in the above-identified patent and that said Letters Patent is hereby corrected as shown below:

Title page Item (57) Abstract, Line 7: After "fixing" delete "frames" and insert -- frame --

Column 1; Line 16: Delete "apparatus, A" and insert -- apparatus. A --

Column 3; Line 35: Delete "in, the" and insert -- is, the --

Column 6; Line 4: Delete "POLON L32 (the brand mane)," and insert -- PORON L32 (the brand name), --

Column 8; Line 23: In Claim 12, after "cushions" delete "have".

Column 8; Line 25: In Claim 13, delete "claim 10," and insert -- claim 6, --

Signed and Sealed this
Eighth Day of February, 2011

David J. Kappos
*Director of the United States Patent and Trademark Office*